Aug. 15, 1933.   B. D. HUBBARD   1,922,046
BALE COVERING AND METHOD OF PREPARING SAME
Filed July 3, 1929   2 Sheets-Sheet 1
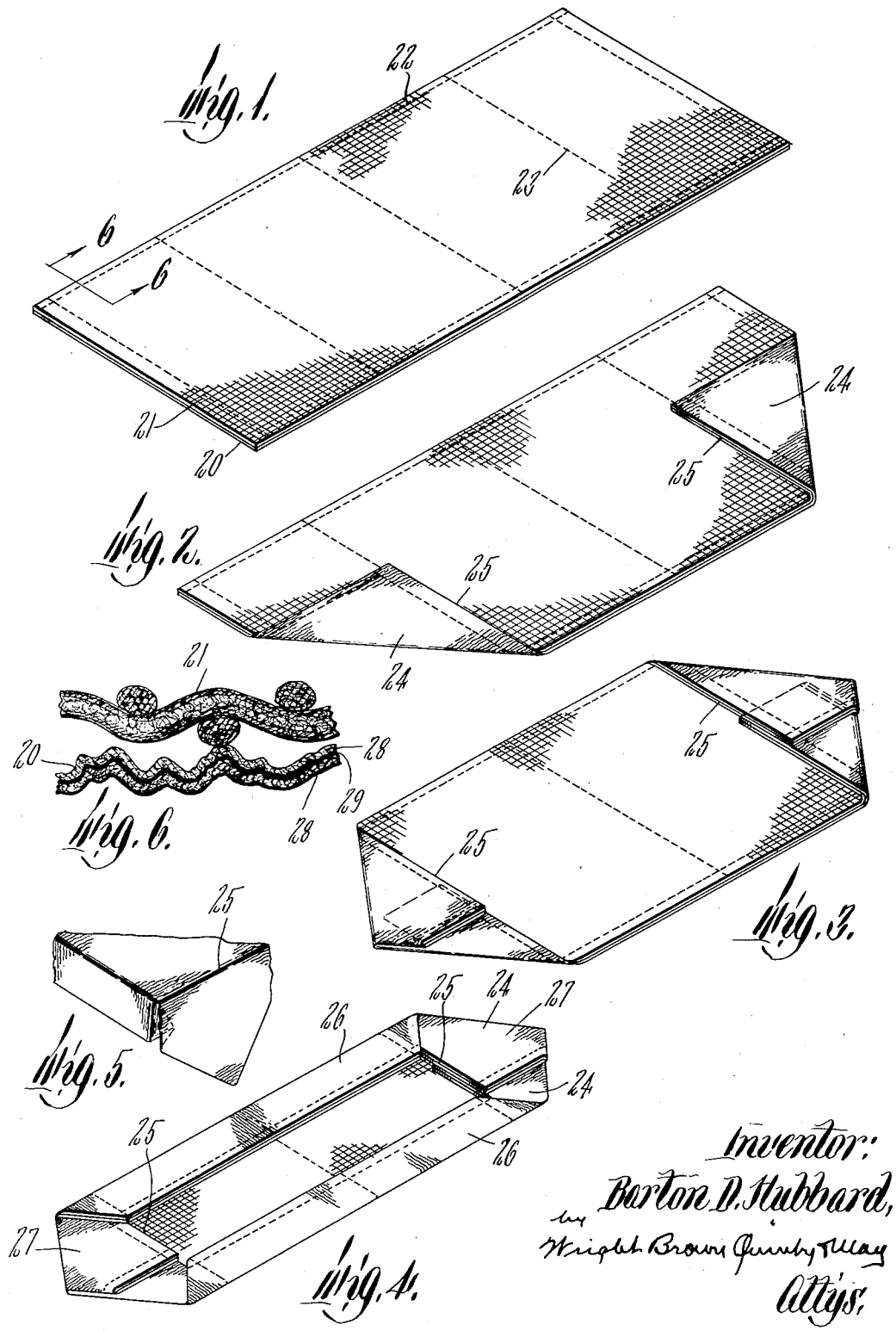

Aug. 15, 1933. B. D. HUBBARD 1,922,046
BALE COVERING AND METHOD OF PREPARING SAME
Filed July 3, 1929 2 Sheets-Sheet 2
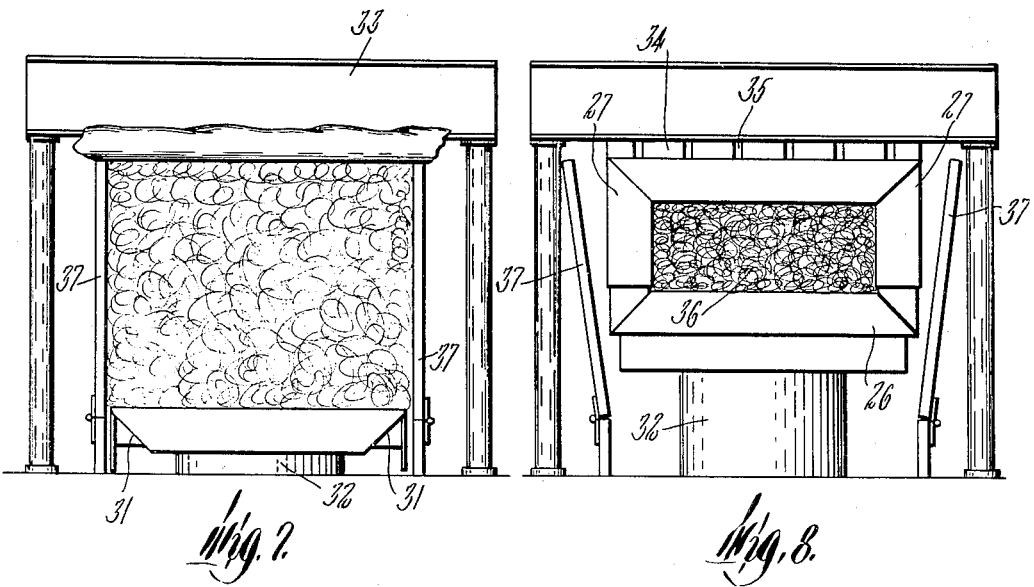
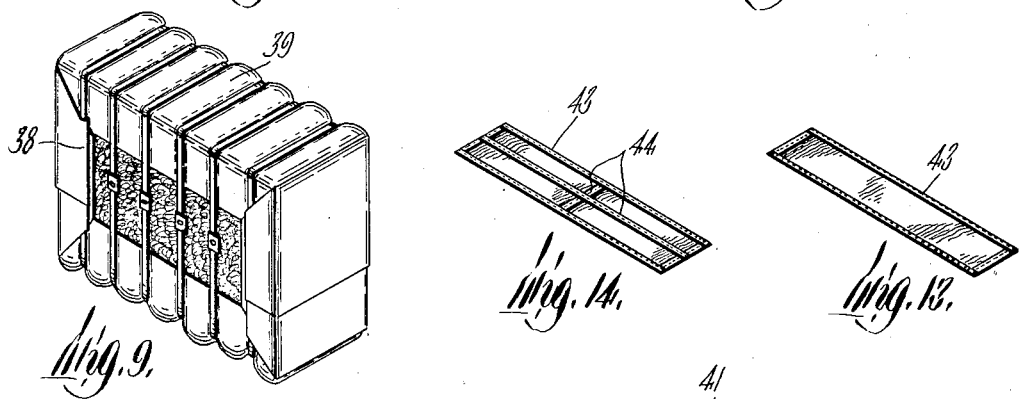
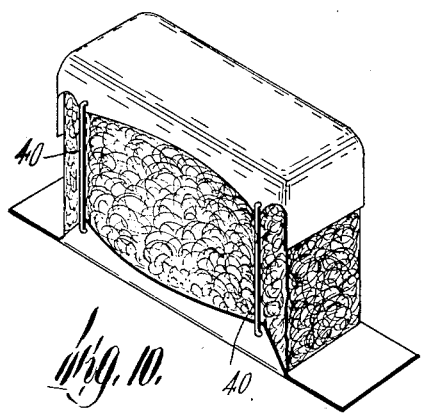
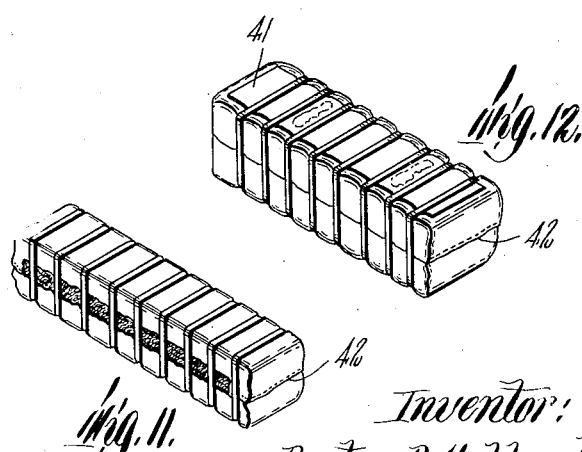
Inventor:
Barton D. Hubbard,
by Wright Browne Quinby Way
Attys.

Patented Aug. 15, 1933

1,922,046

UNITED STATES PATENT OFFICE 1,922,046

BALE COVERING AND METHOD OF PREPARING SAME

Barton D. Hubbard, Portland, Maine, assignor to Brown Company, Berlin, N. H., a Corporation of Maine Application July 3, 1929. Serial No. 375,872

2 Claims. (Cl. 100—14)

This invention relates to coverings for bales and a method of preparing the same to facilitate the application thereof to the material to be baled. The coverings included in this invention are suitable for bales having contents of any materials which can be compressed into bale form without injury thereto. For convenience, the coverings are hereinafter described in detail as applied to bales of cotton.

A large percentage of the cotton which is grown in various parts of the world must be shipped to points at considerable distances. To facilitate such shipment, it has been the custom to compress the cotton fibers into bale form. This economizes space in the carriers and also protects to a large degree the cotton itself from injury and deterioration. Cotton grown in the southern United States is picked in the fields and is collected in carts which transport it to the nearest gin mill. Here the cotton is ginned, this operation separating the lint from the seeds, leaves and other foreign materials. The lint from the gin is collected in a "condenser" where it is formed into a thin sheet or bat. This bat is fed to the gin press where it is collected in the form of a succession of layers. When about 500 pounds of the lint has been collected in a box of the gin press, the press is operated to compress the mass of cotton into bale form. Prior to the introduction of cotton into the press box, the movable platen which customarily forms the floor of the box is covered with a wrap for the bale which is to be formed, a similar wrap being caught over the reaction member which forms the ceiling of the gin press box. Thus when the platen is raised to compress the lint, the two wraps are in place on opposite faces of the body of lint. After the compressing movement of the platen ceases, the marginal portions of the wraps are brought against the side faces of the body of lint so as to cover as much as possible of the sides of the bale. The tie members, which for cotton bales are customarily iron straps, are passed about the bale and are fastened into loops. The marginal portions of the wraps at the ends of the bale are overlapped and their corners are tucked under the nearest tie member so that when the platen pressure is released, the lint expands until the slack of the tie members is taken up. A bale thus prepared is known as a "gin bale" and is of comparatively large size and low density, the height of the bale being in the neighborhood of 46 inches. The gin bale is eventually transported to a compressing plant where it is subsequently subjected to a much higher pressure so as to condense it into a smaller and more compact bale for shipment to its ultimate destination. In its journey from the gin press to the compressing plant, the gin bale is usually subjected to rough treatment including the use of hooks and the removal of samples.

At the compressing plant the tie members of the bale are removed and patches or reinforcing members to cover damaged portions of the wraps are applied to the bottom platen of the press and to the top of the bale. In order to hold the bale together after the removal of the tie members, the marginal portion of the two wraps may be caught together at the four corners of the bale by wire hooks or a few stitches with twine. The kind of compressing step depends on whether the bale is destined for domestic shipment or for transportation abroad. In the former case, pressure is applied to the top and bottom faces only of the bale so that the compressed bale retains substantially the original width of the gin bale but has considerably less height and its more condensed. The marginal portions of the wraps on the side faces of the bale are usually of such width as to overlap slightly when the bale is highly compressed. Thus the bale for domestic shipment is completely covered by the wraps. The slack portions of the wraps on the ends of the bale are folded and sewed together to make a neat finish. If the bale is destined for transportation abroad, the bale is first compressed laterally, after which pressure is applied to the top and bottom, so that the bale is narrower than the domestic bale. The cotton in these bales is customarily compressed to a density of about 32 pounds per cubic foot. The bales are known as "high density" bales.

It is obvious that in view of the rough handling to which a gin bale is subjected during its transportation from the gin press to the compressing plant, the practice of removing samples of cotton from the faces of the bale which are covered by the wraps, and the tremendous pressures to which the bale is subjected in the compressor, the wraps on the bale are subjected to severe treatment. The purpose of the wraps on a bale is to protect the contents of the bale as much as possible from deterioration and loss. A bale wrap should thus be capable of preventing loss of lint through accidental escape between the tie members, of protecting the cotton in the bale from dirt and moisture, of preventing or retarding the escape of natural moisture in the cotton, of minimizing fire hazard by being fire-resistant, and should be sufficiently strong to resist excessive tearing by hooks. The wraps which have heretofore been used in baling cotton have been objectionable for various reasons. The customary coarse burlap is inefficient as a protective agency against dirt, moisture and fire hazard. Such wraps also involve the loss of a certain amount of lint which sticks to the wrap itself when the latter is removed from the bale. Paper wraps have been found unsatisfactory owing to the fact that they cannot be made strong enough to support the pull of hooks inserted in the bale, and also because the paper is apt to shatter when the gin bale is roughly handled.

According to the present invention a wrap is provided which has many desirable characteristics and which is found to be efficacious in protecting the bale and in resisting undue deterioration by hooking and other handling of the bale in the course of transportation. According to the invention I provide a combined paper and burlap wrap, the two layers being lightly tacked together by stitching at separated points so as to permit relative movement of the two layers but to hold them sufficiently together so as to permit the layers to be handled as a single unit. To this end I may provide a wrap consisting of creped kraft paper to which is stitched or otherwise tacked a layer of a suitable textile sheet such as burlap, netting or the like. A suitable paper for this purpose is a two-ply creped kraft paper having a thin layer of asphalt between the plies. No claim is made to this paper per se. The paper is cut out to suitable size in such a way that it is extensible in a longitudinal direction, this being necessary in view of the fact that bales in the compressor are elongated by the high pressure applied and the further fact that the cotton under compression swells out in considerable masses between the ties after being freed from the press, so that unless a wrap is longitudinally extensible the compressor virtually destroys it. The kraft paper layer with its intermediate ply of asphalt, when applied to a bale, is highly resistant to dirt, moisture, fire and vermin. The burlap or textile layer which is lightly tacked thereto and is arranged to be the outer layer of the bale covering, is made sufficiently strong to support the hooks which may be inserted in the sides of the bale.

According to the invention, my improved bale covering is folded in a particular manner so as greatly to facilitate its application to the piston of a gin press. The saving of time in a gin press is a highly important factor in the initial baling of cotton. When the cotton is ready for picking the wagons which bring it to the gin mill are usually forced to await their turn to deliver their load to the mill owing to the inability of the mill to handle the cotton as fast as it is brought in. Thus when the cotton is coming in fast, it is of great importance that the operations of the mill proceed as rapidly as possible. It is an object of my invention to make possible a material saving of time in the application of a pair of wraps to the gin press so that a minimum amount of time may be lost. In applying a bale wrap to a platen, the platen must be covered smoothly by the wrap, and the marginal portions on the sides and the ends of the wrap must be uniform and must be pushed down below the edges of the platen. Ordinarily there is a clearance between the platen and the box wall of from one to two inches at the end edges of the platen and from one-half inch to an inch along the side edges of the platen. It is relatively easy to insert limp material such as burlap through the clearance spaces about the edges of the platen. Such limp material, however, is subject to diagonal distortion so that a certain amount of time must be spent in straightening out such a wrap so that the amount of the overhang on the ends and on the sides will be uniform. My improved wrap which includes a layer of paper is not subject to diagonal distortion since the paper is sufficiently stiff to hold its cut-out shape. Since the burlap associated with the paper layer is tacked thereto at a number of spaced points the paper layer holds the burlap in its cut-out shape. Previous attempts to use paper wraps have resulted in considerable delays in applying the paper to the platen due to the difficulty of pushing the marginal portions of the relatively stiff paper down through the clearance spaces about the edges of the platen. According to this invention the paper and burlap wrap are so folded as to permit their application to the platen with a minimum delay, only a few seconds being required to put the wrap in place on the platen ready to receive the cotton.

For a detailed disclosure of an embodiment of the invention, reference may be had to the description which follows and to the drawings, of which,—

Figure 1 is a perspective view of a wrap embodying the invention.

Figures 2, 3 and 4 are perspective views of the same wrap showing successive steps in folding the wrap to its final form as illustrated in Figure 4.

Figure 5 is a fragmentary perspective view of the wrap after it has been applied to a platen and is ready to receive the cotton.

Figure 6 is a magnified section on the line 6—6 of Figure 1.

Figure 7 is a side elevation of a portion of a gin press showing the wraps in place and the cotton partially compressed.

Figure 8 is a similar view showing the cotton fully compressed and the marginal portion of the wrap folded over the side faces of the body of cotton.

Figure 9 is a perspective view of a complete gin bale.

Figure 10 is a perspective view of a gin bale ready for introduction into a compressor.

Figure 11 is a perspective view of a typical high density bale.

Figure 12 is a perspective view of a standard bale for domestic shipment.

Figures 13 and 14 are perspective views of patches.

Referring to Figures 1 to 4, a wrap embodying the invention may comprise a layer 20 of suitable paper which is extensible without rupture in the direction of the length of the wrap. To the paper layer 20 is fastened a sheet of textile material 21 such as burlap, netting or the like, this layer having sufficient strength to support hooks which may be caught in the bale. The layers 20 and 21 are lightly held together at suitably spaced points so that they are capable of relative movement upon each other but are held together sufficiently to form a unitary wrap which can be handled as a single piece. As shown in Figure 1, the layers may be held together by a line of stitching 22 extending around the wrap near the edges thereof. The wrap may also have a few transverse lines of stitching 23. In order to facilitate the application of the wrap to a platen, the corner portions 24 are first folded over against the face of the textile layer, as indicated in Figures 2 and 3, so that the segments 25 of the side edges of the wrap lie in transverse lines which are mutually distant the length of the platen to which the wrap is to be applied. Then the marginal portions 26 are folded over upon the corner portions 24 and the face of the textile layer, so that the width of the folded wrap as shown in Figure 4 is substantially equal to the width of the platen. The pointed end portions may now be folded toward each other and the wrap rolled or folded into conveniently compact mass for shipment or storage.

When a wrap is applied to a platen, it is first thrown on the platen with the textile face down, that is, inverted from the position illustrated in Figure 4. This results in the folded portions being underneath. The pointed end portions 27 are readily thrust down through the clearance spaces at the ends of the platen so that the intermediate portion of the folded wrap between the lines 25 lies flat on the platen. Then the marginal portions 26 are pulled out from under the intermediate portion of the wrap and are readily thrust down the clearance spaces along the side edges of the platen. Since the side portions 26 overlap the corner portions 24, the ends of the former are readily pulled out so as to take the form illustrated in Figure 5. The whole operation requires but a few seconds, and leaves the platen smoothly covered by a wrap having a paper layer arranged to be directly against the cotton and a textile layer arranged to be on the outside of the bale. Owing to the folds as illustrated in Figure 4, there is no chance of the wrap being placed on the platen in a skew position. The folds also insure a uniformity of width of the overhanging portions at the ends and at the sides of the platen.

Figure 6 illustrates in magnified cross section the materials which may be used in the preferred embodiment of the invention. As therein shown, the paper layer 20 is lowermost and comprises a pair of plies 28 of kraft paper between which is a ply or layer 29 of asphalt. This asphalt layer binds the plies of paper together and renders the paper sheet resistant to dirt, moisture, fire, and vermin. The paper sheet, as shown, is preferably creped. Against a face of the sheet is loosely held a textile sheet which is preferably of loosely woven material such as burlap.

Figure 7 illustrates a portion of a gin press with a partially pressed bale therein. The usual gin press includes a platen 31 mounted on a piston 32 by which it is moved toward a reaction member 33 usually composed of a number of steel I-beams or the like. Underneath the beams 33 are a number of cross members 34, usually of wood, which are sufficiently spaced as at 35 to permit tie members to be passed between them so as to encircle the compressed body of cotton 36. When the cotton is compressed as shown in Figure 8, the upper portions 37 of the side walls of the press box may be swung aside to permit the end flaps 27 to be folded over the ends of the bale. Prior to the application of pressure to the cotton body, a wrap is applied to cover the bars 34 as shown in Figure 7, the edges of the wrap being turned up over the ends of the bars 34 and caught on nails or otherwise temporarily fastened. When the body of cotton is fully compressed the marginal portions of the upper wrap are released and bent downwardly over the side faces and ends of the body of cotton. The marginal portions of the lower wrap are bent upwardly against the faces and ends of the cotton as shown in Figure 8. The wraps are customarily made of insufficient width to cover entirely the side faces of a gin bale so that a certain amount of the cotton is exposed on the side faces. Since the cotton is originally introduced into the press in a kind of stratified form, the edges of these strata form exposed portions on the sides of the bale. These edge portions are less liable to pull out than are the portions of the cotton on the top and bottom of the bale, so that there is less need for protection on the side faces than on the top and bottom. The side marginal portions 26 of the wraps are wide enough, however, to meet when the bale is later subjected to high pressure in the compressor. Thus material is saved and excessive overlap of the side marginal portions of the wraps in the ultimate bale is avoided.

Figure 9 illustrates a typical gin bale, the edges of which are entirely covered by the wraps. As herein illustrated, the corner portions of the wraps are tucked under the adjacent tie member as at 38 so as to avoid loose ends. When the gin bale is prepared for the compressor, the tie members 39 are removed and the bale is held together as by suitable elongated hooks 40 which are caught into the edges of the wraps near the ends of the bale. If the wraps have been badly torn in transportation from the gin mill, a suitable patch may be laid on the platen of the compressor, the bale being deposited upon this patch. Another patch may be laid on top of the upper wrap to cover rents or holes therein. The bale may then be compressed to a height of approximately ten inches, whereupon the tie members are applied in the same manner as in the making of the gin bale, sufficient slack being left to permit an expansion of the bale to a height of approximately 18 inches. This results in a standard bale for domestic shipment as illustrated in Figure 12, this bale being shown with a patch 41 thereon. The end portions of the wraps of such a bale are folded over each other and stitched together as at 42. If the bale is intended for foreign shipment, the side faces of the bale are first compressed, after which pressure is applied to the top and bottom so that a narrow bale such as illustrated in Figure 11 is formed. The bales formed in the compressor are elongated by the high pressure so that their eventual length is usually about three inches greater than the gin bale. Hence the patches 41 should preferably be capable of substantial elongation. To this end I may use patches of creped kraft paper such as are illustrated in Figures 13 and 14. In order to facilitate handling and to save time in the introduction of the patches into the compressor, the patches may be provided with marginal stiffening members 43 to prevent curling or rolling up of the creped paper which has been cut to suitable size and shape. These reinforcing strips 43 are preferably strips of stiff paper which may be stitched or otherwise fastened to the paper patch.

As shown in Figure 14 I may provide in addition to the marginal reinforcing strips 43, additional strips 44 preferably extending on the median lines of the patches. With these reinforcing strips to prevent curling, the patch may be tossed onto the platen of a compressor and a gin bale may thereupon be placed on the platen without further adjustment of the patch. Thus the patches may be applied with a minimum expenditure of time.

I claim:

1. A bale wrap comprising a sheet of material substantially larger than the face of a gin press platen, said sheet having its four corners folded in against the same face of the sheet, the inturned segments of the side edges of the sheet lying on transverse lines mutually distant the length of said platen, said sheet having its side marginal portions folded inwardly over the folded corner portions so that the width of the folded sheet is approximately equal to that of the platen.

2. A method of folding a rectangular bale wrap, which comprises first folding the four corners in upon the same face so that the inturned portions of the side edges of the wrap lie on transverse lines mutually distant the length of a gin press platen, then folding the marginal side portions over the folded corner portions to make the width of the folded wrap approximately equal to that of said platen.

BARTON D. HUBBARD.